United States Patent
Ranjan et al.

(10) Patent No.: US 7,830,875 B2
(45) Date of Patent: Nov. 9, 2010

(54) AUTONEGOTIATION OVER AN INTERFACE FOR WHICH NO AUTONEGOTIATION STANDARD EXISTS

(75) Inventors: Ashish Ranjan, Sunnyvale, CA (US); Ankur Singla, San Jose, CA (US); Harshad Nakil, San Jose, CA (US); Pedro R. Marques, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 569 days.

(21) Appl. No.: 11/762,478

(22) Filed: Jun. 13, 2007

(65) Prior Publication Data

US 2008/0310432 A1 Dec. 18, 2008

(51) Int. Cl.
*H04L 12/28* (2006.01)
(52) U.S. Cl. ...................................... 370/389
(58) Field of Classification Search ............... 370/445, 370/401, 229–236, 389, 391, 392, 400, 464, 370/465, 468; 726/12; 709/246, 249, 252, 709/253
See application file for complete search history.

(56) References Cited

U.S. PATENT DOCUMENTS

| | | | | |
|---|---|---|---|---|
| 5,748,634 A * | 5/1998 | Sokol et al. | ................. | 370/402 |
| 5,909,444 A * | 6/1999 | Lee et al. | ................. | 370/462 |
| 6,108,345 A * | 8/2000 | Zhang | ................. | 370/445 |
| 6,501,734 B1 * | 12/2002 | Yu et al. | ................. | 370/236 |
| 6,584,109 B1 * | 6/2003 | Feuerstraeter et al. | ....... | 370/401 |
| 6,912,199 B1 * | 6/2005 | Liang | ................. | 370/236 |
| 6,934,261 B1 * | 8/2005 | Vo et al. | ................. | 370/255 |
| 7,260,654 B1 * | 8/2007 | Satapathy et al. | ........... | 709/250 |
| 2001/0021174 A1 | 9/2001 | Luijten et al. | | |
| 2003/0105830 A1 * | 6/2003 | Pham et al. | ................. | 709/216 |
| 2007/0079366 A1 * | 4/2007 | Geffner | ................. | 726/12 |

OTHER PUBLICATIONS

European Search Report dated Mar. 27, 2008, for corresponding European Application No. 07 25 4043, 8 pgs.
"XAUI, XGMII, XSBI-10 GE Interfaces," Xilinx®, Emerging Standards & Protocols, 67 pgs, date unknown.
Communication Pursuant to Article 94(3) EPC dated Mar. 23, 2010, for European patent application No. 07254043.8, filed Oct. 11, 2007, 3pp.

* cited by examiner

*Primary Examiner*—Dmitry H Levitan
(74) *Attorney, Agent, or Firm*—Shumaker & Sieffert, P.A.

(57) ABSTRACT

A method for enabling autonegotiation over an interface for which no autonegotiation standard exists comprises establishing network communication between a first network device and a second network device over a communication link. The first network device includes a first media access controller (MAC) associated with a communication port coupled to the communication link and a second MAC positioned between the first MAC and the communication port, and the second MAC operates as a proxy MAC for the first MAC. The first MAC outputs an outbound data communication to the communication port at a first communication rate. The proxy MAC intercepts the outbound data communication. The proxy MAC then outputs the outbound data communication to the communication port at a second communication rate different from the first communication rate.

17 Claims, 5 Drawing Sheets

AUTONEGOTIATION OVER AN INTERFACE FOR WHICH NO AUTONEGOTIATION STANDARD EXISTS

TECHNICAL FIELD

The invention relates to computer networks, and more particularly to communications with a computer network.

BACKGROUND

A computer network is a collection of interconnected computing devices that can exchange data and share resources. The Open Systems Initiative ("OSI") model of a network comprises seven layers. A layer two ("L2") network protocol may, for example, handle framing of data and interface between the higher layers and the physical layer. Ethernet is one example of a L2 communication protocol. Network switches are an example of L2 devices which participate in the exchange of data. Network switches connect a plurality of network devices to each other. A device connected to one port of a network switch is typically able to communicate directly with any other device connected to another port of that network switch.

Autonegotiation is the process by which two devices in communication select different parameters like maximum transmission rate, flow control, full-duplex or half-duplex, supported by both devices. For example, if one device supports a transmission rate of 1 Gb/s, but another device only supports up to 100 Mb/s, it may be possible for these two devices to communicate at a lower speed of 10 Mb/s, but transmission at the maximum transmission rate supported by both devices (i.e., 100 Mb/s in this example) would increase the speed with which the devices may share data, as well as increase network efficiency. Therefore, the devices would likely autonegotiate and attempt to communicate at the maximum transmission rate of 100 Mb/s.

Varieties of physical connections and data transmission rates exist for interconnecting network devices. Each class of connections may have a unique standard issued by the Institute of Electrical and Electronics Engineers ("IEEE"). For example, IEEE standards exist for various connection materials, such as fiber, copper, and twisted-pair, at rates of 10 megabits per second (Mb/s), 100 Mb/s, and 1000 Mb/s. These standards are important for developers of network devices, such as switches, hubs, and routers, so that the devices may autonegotiate a rate at which to exchange data between each other.

As standards evolve and new standards emerge, the specified interface format between the media access controller (MAC) and the physical layer (PHY) often changes. In some cases, an industry standard for achieving a high transmission speed, such as 1 Gb/s, may require a different physical interface format than the that of an existing standard for lower-speed transmission. Moreover, in some cases it may be desirable to utilize the physical interface format for the higher-speed communication even though the new standard has not yet been fully adopted or widely deployed. This may present challenges if, in order to comply with the standard, a devices is required to support auto-negotiation to lower speeds that require different physical interfaces.

SUMMARY

In general, this disclosure describes techniques for implementing a network device to support autonegotiation of various transmission rates. The network device may be, for example, a network switch. The techniques may be applied to enable simple, timely modification of the network switch when new network standards evolve.

For example, in one example, a network switch may include one or more switching application-specific integrated circuits ("ASICs"), and one or more enhanced physical interface modules ("PHYs"). The switching ASIC may include one or more internal media access controller ("MACs") coupled to the enhanced PHYs. That is, the enhanced PHYs, which may be positioned between the ASICs and the various interfaces connected to the network switch for communicating data between the MACs and the network interfaces.

As described herein, an enhanced PHY may be a chip separate from the switching ASIC, and incorporates additional functionality resembling a pared-down MAC. In other words, in addition to providing the physical interface layer of the network switch (i.e., L1 functions), the enhanced PHY incorporates MAC functionality (normally associated with L2 of the network stack). This simple MAC within the PHY may act as a proxy for the MAC residing in the switching ASIC. That is, a proxy MAC may be enabled to perform a subset of the functions of a fully functioning MAC, such as flow control, data transmission, and data storage, while not necessarily supporting the other functions of a standard MAC. The proxy MAC may use standard flow control mechanisms between the proxy MAC/PHY and the standard MAC to regulate the data transmission rate of the fully functioning MAC to correspond with the network device with which the proxy MAC is communicating. In addition to its proxy MAC, the enhanced PHY implements standard PHY functions, i.e., provides the physical interface hardware to provide connectivity to other network devices. The standard PHY interface may support connections of various materials operating at various rates, as well as autonegotiation with devices supporting any of these various transmission rates.

In one embodiment, the invention is directed to a method in which network communication is established between a first network device and a second network device over a communication link, wherein the first network device includes a first media access controller (MAC) associated with a communication port coupled to the communication link and a second MAC positioned between the first MAC and the communication port, wherein the second MAC operates as a proxy MAC for the first MAC. The first MAC outputs an outbound data communication to the communication port at a first communication rate. The proxy MAC intercepts the outbound data communication. The proxy MAC then outputs the outbound data communication to the communication port at a second communication rate different from the first communication rate.

In another embodiment, the invention is directed to a network device comprising a first media access controller (MAC) associated with a communication port, the first MAC configured to output an outbound data communication to the communication port at a first communication rate, and a second MAC positioned between the first MAC and the communication port, the second MAC configured to intercept the outbound data communication and output the outbound data communication to the communication port at a second communication rate different from the first communication rate.

In another embodiment, the invention is directed to a method in which a first set of network devices are manufactured, each of the network devices including a first media access controller (MAC) associated with a communication port and a second MAC positioned between the first MAC and the communication port to operate as a proxy MAC for the first MAC. The first MAC is configured to output data communications in accordance with a first communication standard for which auto-negotiation has not yet been adopted. The proxy MAC is configured to intercept the outbound data communication with the proxy MAC and output the outbound data communication from the proxy MAC in accordance with a second communication standard for which auto-negotiation has been adopted. In accordance with the method, after auto-negotiation for first communication standard has been adopted, manufacturing a second set of network devices, wherein each of the second set of network devices include the first media access controller (MAC) and exclude the proxy MAC.

The techniques described herein may provide certain advantages. For example, the switching ASIC may be designed to support an emerging network interface format that has not yet been fully adopted or widely implemented. By positioning the enhanced PHY and its proxy MAC between the switching ASIC and the network connections, the enhanced PHY may be relied upon to perform autonegotiation with devices using standard protocols while interacting with the MAC of the switching ASIC using the non-standard interface. This allows the switching ASIC to be designed, fabricated and deployed within network devices prior to the non-standard interface being adopted. Moreover, only the circuitry containing the enhanced PHYs need be replaced or removed upon evolution of the network, for example, upon standardization of the higher-speed data transmission rate or interface format.

For example, most recently, 10 gigabit Ethernet ("10GE"), which operates at a rate of 10 gigabits per second ("Gb/s"), has emerged as the fastest recognized Ethernet standard at this time. The IEEE has developed a standard for a 10 gigabit attachment unit interface ("XAUI"). The current standard, however, only provides for operating at 10 Gb/s; it does not provide for negotiating down to a slower rate if another device does not support 10GE. The IEEE is currently developing the IEEE 802.3AP standard, one goal of which is to create a standard for a backplane which can operate at any of the standard rates. A backplane may be used to physically couple numerous network ports together, wherein the ports may operate at various rates over various materials. One advantage of the techniques described herein may be enabling a network device to take advantage of 10GE without finalization of the IEEE 802.3AP standard.

One embodiment of the techniques described herein may comprise a switching ASIC which supports 10 GE, and a network switch which supports autonegotiation of various network rates, before IEEE 802.3AP is finalized by using an enhanced PHY Once IEEE 802.3AP is finalized, it may be possible to simply replace the enhanced PHY with a standard PHY while retaining the present ASIC and maintaining support for 10GE autonegotiation during all phases of this process. This may prove advantageous in that replacing an enhanced PHY may be much less expensive than replacing an entire ASIC.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
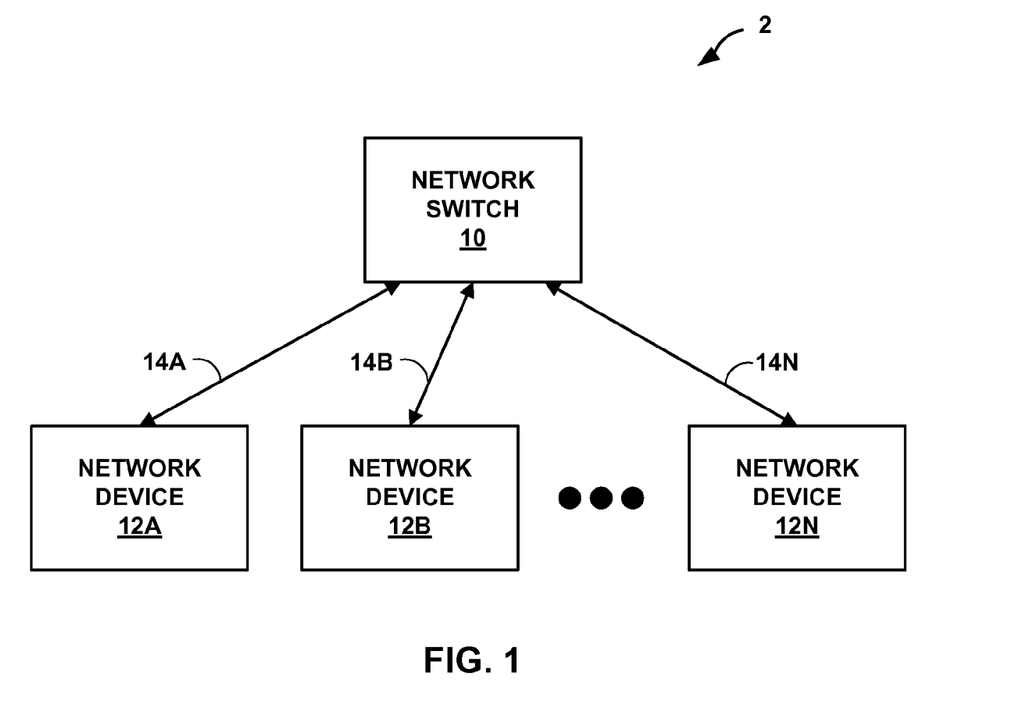
FIG. 1 is a block diagram illustrating an exemplary computer network environment.

FIG. 1 is a block diagram illustrating an exemplary computer network environment 2. In this simplified example, computer network environment 2 includes network switch 10 coupled to network devices 12A-12N ("network devices 12"). Links 14A-14N ("links 14") are connected to communication ports of network switch 10 and network devices 12, and communicatively couple network switch 10 to respective network devices 12. For example, link 14A couples network device 12A to switch 10. Although discussed with respect to a network switch, the techniques described herein may be applied to any network device.

Each of links 14 may be a different style of connector. Links 14 may be formed from a variety of connective materials, for example, fiber, copper, and twisted pair cables, and links 14 may also support various transmission rates. For example, links 14 may support transmission rates of 10 megabits per second (Mb/s), 100 Mb/s, 1 gigabit per second (Gb/s, equivalent to 1000 Mb/s), or 10 Gb/s. Network switch 10 may support a plurality of various links 14. For example, link 14A may be a 10 Gb/s fiber cable (e.g., GBase-SR), link 14B may be a 1 Gb/s copper cable (e.g., 1000Base-T), and link 14N may be a 100 Mb/s twisted pair cable (e.g., 100Base-T).

In general, network switch 10 interconnects network devices 12. For example, network device 12A may need to transmit data to network device 12B. In this case, network device 12A may first construct a data communication unit, optionally including an indication that network device 12B is the intended recipient; network device 12A may then transmit the data communication unit to network switch 10. A data communication unit may be, for example, a network packet, cell, frame or other data unit.

For example, network switch 10, upon receiving the data communication unit, may determine to which of network devices 12 to send the data communication unit. Network switch 10 may process the data communication unit to identify the destination of the data and select a link 14 to which to forward the data unit. For example, as an L2 switch, network switch 10 may monitor communications within network 2 and learn a topology of the network. That is, network switch 10 may learn MAC addresses associated with network devices 12 coupled to links 14 and generally maintain state information associated with an L2 network.

As another example, network switch 10 may instead be a network router or other device that performs L3 routing functions. To perform routing functions, network switch 10 maintains a network topology and forwarding information to forward packets along paths within the network. In any case, the techniques described herein may be incorporate within any type of network device that requires physical interfaces to network links.

Network switch 10 incorporates physical interfaces ("PHYs") (FIG. 2) that provide the physical interface to the communication media of links 14. In some cases, network switch 10 may need to perform autonegotiation with one or more of network devices 12, for instance, network device 12A, in order to effectively communicate with network devices 12. In this case, the PHYs may also perform autonegotiation, as autonegotiation is generally viewed as a physical layer, or layer one ("L1") function.

As an example, network switch 10 may support several data transmission rates, for example, 10 Gb/s, 1 Gb/s, 100 Mb/s, and 10 Mb/s. Network device 12A, however, may only support transmission rates up to 100 Mb/s. Network switch 10 and network device 12A negotiate a speed at which both are capable of transmitting data, in this case, 100 Mb/s. Autonegotiation may further establish other communication features, such as whether the communicating devices support half-duplex or full-duplex communication.

The techniques described herein may provide certain advantages. For example, the switching ASICs of network switch 10 may be designed to support an emerging network interface format that has not yet been fully adopted or widely implemented. Within network switch 10, an enhanced PHY and a proxy MAC is positioned between the switching ASICs and physical ports connected to links 14. The enhanced PHY may be relied upon to perform autonegotiation with any of network devices 12 using standard protocols, while interacting with MACs implemented within the switching ASICs within network switch 10 using a non-standard, emerging interface. This allows the switching ASIC of network switch 10 to be designed, fabricated and deployed prior to the non-standard interface being adopted. Moreover, only the circuitry within network switch 10 containing the enhanced PHYs need be replaced or removed upon evolution of network 2, for example, upon standardization of the higher-speed data transmission rate or interface format by network devices 12.

As one example, the switching ASICs of network switch 10 may be designed to incorporate 10 Gb/s attachment unit interfaces ("XAUIs") that may not have a standard for autonegotiating to data transmission rates below 10 Gb/s. At this time IEEE is currently developing a standard to permit autonegotiation over a XAUI, in the form of IEEE 802.3AP, this standard is not yet finalized. The techniques described herein may permit development of a network device, such as a network switch 10, to incorporate a chipset that utilizes an interface for which no standard exists for performing autonegotiation, such as a XAUI, and provides for simple, subsequent modification of the device to accommodate evolution of the network and network standards. As one example, the techniques herein may permit network switch 10 to incorporate switching ASICs that utilizes XAUI interfaces and yet perform auto-negotiation with network devices 12, even in lieu of the IEEE 802.3AP standard. Once the new standard which includes autonegotiation has been adopted, for example once IEEE 802.3AP has been adopted, one may manufacture a new set of network devices which include the primary MAC but not the proxy MAC, as the proxy MAC is no longer needed. For example, with reference to FIG. 2, one could merely replace physical interface modules 18A-18N ("enhanced PHYs 18") with standard PHYs, possibly resembling PHYs 22.

Figure 2:
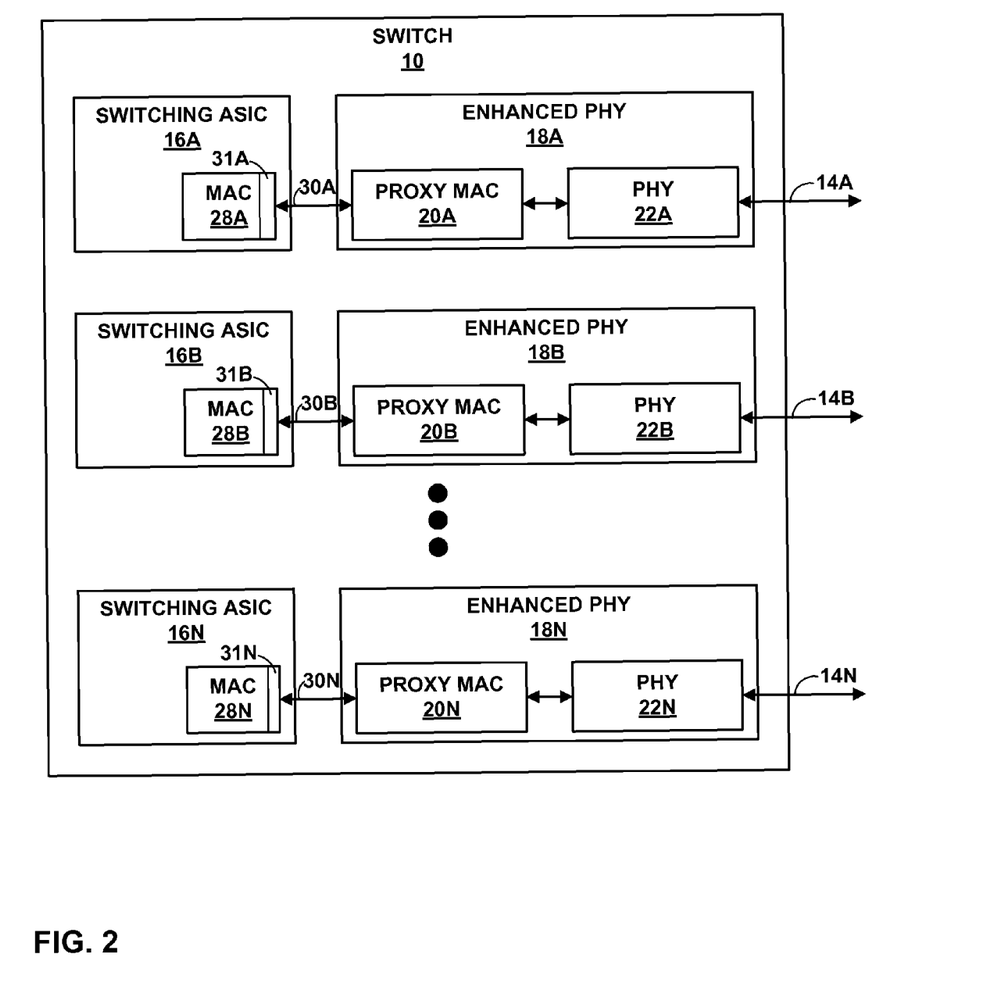
FIG. 2 is a block diagram illustrating an example embodiment of a network switch.

FIG. 2 is a block diagram illustrating an example embodiment of network switch 10. In the example embodiment, network switch 10 is shown to include a plurality of switching application-specific integrated circuits 16A-16N ("switching ASICs 16"), although as few as only a single switching ASIC may be utilized. Although not shown in FIG. 2, switching ASICs 16 may be interconnected to form a switching fabric for forwarding data units, e.g., network frames.

Each of switching ASICs 16 is shown to include at least one media access controller ("MAC") associated with a different physical port. For example, ASIC 16A includes an internal MAC 28A that is associated with a physical port that provides connectivity to link 14A. Each of MACs 28 provides layer 2 functions for their respective ports, and utilizes a physical interface 31, which may be a so-called next generation physical interface 31 that may not yet be adopted as an industry standard. In one embodiment, for example, each of MACs 28 may utilize a 10 Gb/s attachment unit interface ("XAUI"). As described below, this exemplary embodiment may permit network switch 10 to deploy XAUI interfaces and still support auto-negotiation even without a standard yet having been adopted.

Network switch 10 further includes one or more enhanced physical interface modules 18A-18N ("enhanced PHYs 18"), which may be implemented as one or more chips external to switching ASICs 16. In this example, each of enhanced PHYs 18 corresponds to respective switching ASICs 16, although this arrangement is merely for purposes of example. Each of enhanced PHYs 18 includes logic for implementing a proxy MAC and additional logic for implementing functions associated with a standard PHY For example, enhanced PHY 18A comprises proxy MAC 20A and PHY 22A. Corresponding switching ASICs 16 and enhanced PHYs 18 are coupled internal connections 30A-30N ("connections 30"). In one embodiment, connections 30 are each XAUIs.

Standard PHYs 22 provide physical interfaces between network switch 10 and respective network devices 12 via respective links 14. Each of PHYs 22 may support a variety of materials of connectors, for example, fiber, copper, and twisted pair cables. Moreover, each of PHYs 22 may support various transmission rates along these materials, for example, transmission rates of 10 Mb/s, 100 Mb/s, 1 Gb/s, and 10 Gb/s. Each of PHYs 22 may also communicate with a corresponding network device, for example, PHY 22A may communicate with network device 12A, to perform autonegotiation to select the fastest rate at which PHY 22A and network device 12A may exchange data, as well as whether to exchange data in half-duplex or full-duplex mode.

Proxy MACs 20A-20N ("proxy MACs 20") implement certain L2 functions and may therefore be viewed as acting as proxies for respective MACs 28. That is, proxy MAC 20A may support a subset of the functions of MAC 28A, such as flow control, data transmission, and data storage. Moreover, proxy MAC 20A may act as a proxy for MAC 28A, and communicates with MAC 28A and network devices coupled to link 14A. Proxy MAC 20A may also "spoof" the MAC address of MAC 28A; that is, proxy MAC 20A may receive traffic intended for MAC 28A, and proxy MAC 20A may send traffic as if MAC 28A had sent that traffic. Proxy MAC 20A and PHY 22A may support a plurality of transmission rates, for example, rates of 10 Mb/s, 100 Mb/s, 1 Gb/s, and 10 Gb/s. Proxy MAC 20A need not necessarily support all other functions of a standard MAC, for example, evaluation of FCS checksums and interfacing to the logical link control ("LLC") layer. Exemplary proxy MAC 20A is described in greater detail below with respect to FIG. 3.

Each of MACs 28 and interfaces 31 may be constructed to be capable of communicating with devices which operate at the same data transmission rate without necessarily supporting auto-negotiation to other data transmission rates. For example, MAC 28A may utilize a XAUI interface 31A with the expectation that MAC 28A will interact with network device that also uses a XAUI interface. Accordingly, from the vantage point of MAC 28A, for example, MAC 28A is communicating with a distinct network device rather than proxy MAC 20A. That is, MAC 28A need not necessarily be aware of proxy MAC 20A nor communicate in a modified manner in comparison to communication with other network devices.

Proxy MAC 20A may utilize flow control messages and internal buffers to throttle MAC 28A down to a slower data transmission rate. MAC 28A, assuming that these flow control messages originate from a distinct network device, may adjust the data transmission rate accordingly in response to the flow control messages. In this way, it may be possible for switching ASICs 16 to be designed and deployed to utilize network interfaces for which no standard for autonegotiation yet exists, such as a XAUI, yet network switch 10 may still maintain support for autonegotiation with other devices. Therefore, the design and deployment of the switching ASICs 16 need not be delayed while waiting for the standards related to interfaces 31 are finalized, adopted and ultimately widely used.

Figure 3:
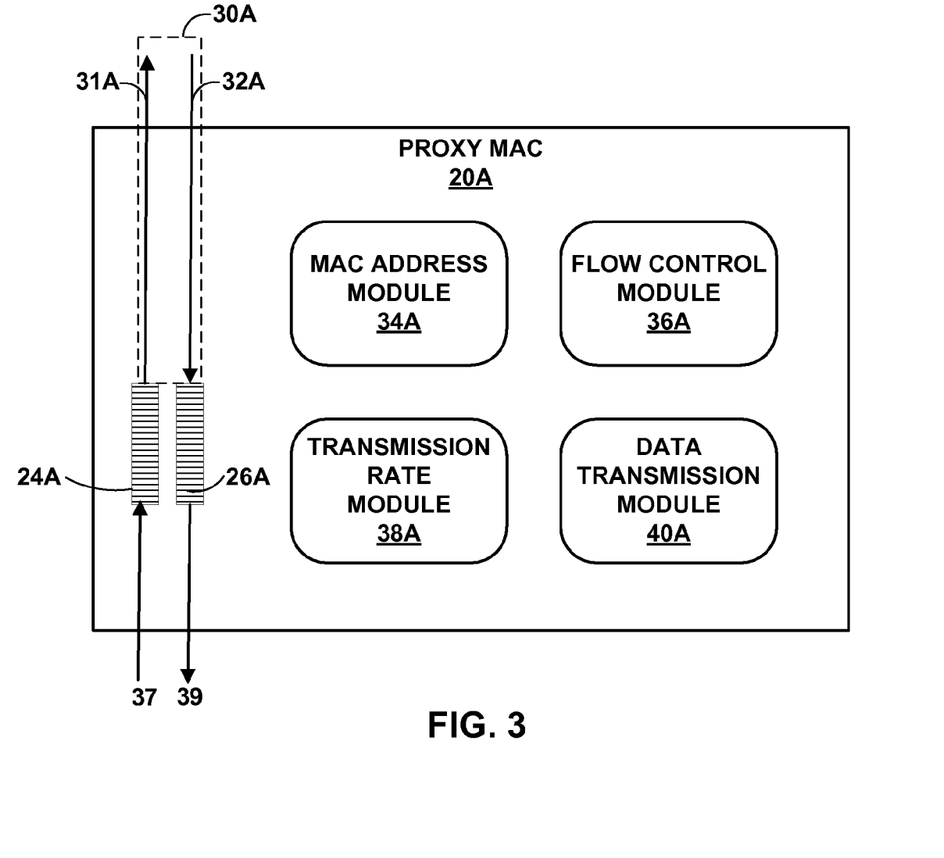
FIG. 3 is a block diagram illustrating an example proxy medium access controller ("MAC") in detail.

FIG. 3 is a block diagram illustrating an exemplary embodiment for proxy MAC 20A in further detail. In the example embodiment, proxy MAC 20A comprises inbound queue 24A, outbound queue 26A, MAC address module 34A, flow control module 36A, transmission rate module 38A, and data transmission module 40A.

In general, MAC 28A of network switch 10 may not be able to directly autonegotiate with network device 12A for some reason, for example, MAC 28A may support a data transmission rate or an interface for which no standard exists for performing autonegotiation. By using enhanced PHY 18A, which is capable of performing autonegotiation at present network standards, network switch 10 may autonegotiate with network device 12A. Once the network standards evolve to conform to the output interface format of switching ASICs 16, enhanced PHY 18A may be replaced with a standard PHY Enhanced PHY 18A permits autonegotiation with network device 12A, even though MAC 28A may only support one network transmission rate or interface for which no autonegotiation standard exists. As one example, proxy MAC 20A may support several industry-standard network transmission rates and/or interfaces for which autonegotiation protocols do exist. In one example embodiment, proxy MAC 20A may support transmission rates of 10 Gb/s, 1 Gb/s, 100 Mb/s, and 10 Mb/s, while MAC 28A may only support a XAUI interface, operating at 10 Gb/s. Moreover, network device 12A may only support 100 Mb/s. No network standard may yet exist for auto-negotiating a XAUI interface unit down to 100 Mb/s. Therefore, proxy MAC 20A may act as a proxy for MAC 28A for the same physical connection medium. Proxy MAC 20A may perform a subset of the functions of a fully functioning MAC, such as flow control, in order to permit communication between network switch 10 and network device 12A. That is, in addition to handling flow control messages from MAC 28A and network device 12A, proxy MAC 20A may generate flow control messages to regulate the transmission rate of MAC 28A. Although it may be low-complexity interface logic in comparison to switching ASICs 16, PHY 22A, likewise, may be enabled to perform autonegotiation at various transmission rates, including, for example, 10 Gb/s, 1 Gb/s, 100 Mb/s, and 10 Mb/s.

Proxy MAC 20A incorporates a transmission rate module 38A to perform autonegotiation with network device 12A. If no transmission rate has been determined, PHY 22A may need to perform autonegotiation with network device 12A. To ensure the determined transmission rate is followed, transmission rate module 38A may signal flow control module 36A to send a flow control message to MAC 28A in accordance with the transmission rate negotiated between PHY 22A and network device 12A. Specifically, flow control module 36A may form an internal flow control message to signal MAC 28A to start and stop the transmission of bursts of data from MAC 28A, possibly at a high speed relative to the negotiated speed used for communication with network device 12A. In one embodiment, flow control module 36A forms a flow control message comprising a flow control frame. Flow control module 36A may send the flow control message to inbound queue 24A, where the message will be stored until the message can be sent to MAC 28A along with inbound packets 37 received from network device 12. MAC 28A, upon receiving the flow control message (e.g., a stop message or start message), responds by halting the output of data or reinitiating transmission based on the flow control message.

In some embodiments, MAC address module 34A "spoofs" the MAC address of MAC 28A by using the same MAC address or by substituting its own MAC address for all data transmission received from MAC 28A. In general, a MAC address uniquely identifies a physical port of a device on a network. Because proxy MAC 20A acts as a proxy for MAC 28A, proxy MAC 20A receives all inbound data from network link 14 first, and transmits outbound data and flow control messages to network device 12A as the message were directly from MAC 28A. MAC address module 34A performs the MAC processing functions, e.g., either retrieving the MAC address of MAC 28A or substituting its own MAC address. In performing functions on behalf of MAC 28A, anytime the MAC address of MAC 28A must be used, MAC address module 34A will use the MAC address of MAC 28A or substitute its own MAC address so as to hide the MAC address of MAC 28A.

Data transmission module 40A is generally responsible for interfacing with the physical layer, i.e., PHY 22A, to send and receive data. Data transmission module 40A also manages queues 24A, 26A. Queues 24A, 26A act as buffers between MAC 28A and proxy MAC 20A for inbound packets 37 received from the network and outbound packets 39 sent to the network. Upon receiving a data communication unit from one of network device 12A, data transmission module 40A may store the data communication unit in inbound queue 24A. In addition, data transmission module 40A may store in inbound queue 24A internal flow control messages generated by flow control module 36A and to be communicated to MAC 28A. When data transmission module 40A determines that data transmission to MAC 28A is possible, data transmission module 40A sends data from inbound queue 24A to MAC 28A. Data transmission module 40A stores outbound data communication units received from MAC 28A, intended for network device 12A, in outbound queue 26A. When network device 12A is ready to receive the data communication unit, data transmission module 40A sends the data communication unit from outbound queue 26A to network device 12A. In addition, data transmission module 40A may store in outbound queue 26A external flow control messages generated by flow control module 36A for delivery to network device 12A.

Connection 30A, which couples proxy MAC 20A to MAC 28A, may provide support for full-duplex communication. That is, connection 30A may permit data flow in both directions simultaneously. For purposes of clarity, FIG. 3 represents connection 30A as directed links 31A, 32A. In the exemplary embodiment, proxy MAC 20A sends data to MAC 28A using link 31A, and proxy MAC 20A receives data sent from MAC 28A using link 32A. Data sent from MAC 28A to proxy MAC 20A is stored in outbound queue 26A. Likewise, data to be sent from proxy MAC 20A to MAC 28A is stored in inbound queue 24A. Flow control module 36A, for example, may form an internal flow control frame for MAC 28A based on a current storage level of outbound queue 26A, and data transmission module 40A may store the flow control frame in inbound queue 24A to be sent to MAC 28A. Similarly, data transmission module 40A, upon receiving a data communication unit from network device 12A, may store the data communication unit in inbound queue 24A.

When MAC 28A sends data to proxy MAC 20A, the data is stored in outbound queue 26A until data transmission module 40A is ready to send the data to network device 12A. Furthermore, in some instances, MAC 28A may output flow control messages, which proxy MAC 20A intercepts and uses to control transmission from inbound queue 24A to switching ASIC 16A.

A minimum size of queues 24A, 26A may be determined according to the internal round-trip delay between MAC 28A and proxy MAC 20A. That is, the minimum size of queues 24A, 26A can be determined as a function of the delay for communication between MAC 28A and proxy MAC 20A. In one embodiment, inbound queue 24A is long enough to hold a data communication unit received from network device 12A as well as a flow control message from flow control module 36A. Outbound queue 26A is long enough to hold one data communication unit received from MAC 28A. In a worst case, proxy MAC 20A may have received and not processed an outbound data communication unit from MAC 28A intended for network device 12A, data transmission module 40A may have received and not processed an inbound data communication unit from network device 12A intended for MAC 28A, and at this time flow control module 36A prepares a flow control message (e.g., stop transmission) for MAC 28A, all within a very short proximity of time, for example, before either of queues 24A, 26A can be emptied. In this case, a length of inbound queue 24A sufficient to hold the unprocessed inbound data communication as well as the newly generated flow control message for MAC 28A is sufficient and provides a highly efficient proxy MAC using limited buffering resources.

In one embodiment, a data communication unit may be a 1,000 byte long frame, so outbound queue 26A may be 1,000 bytes long and inbound queue 24A may be 2,000 bytes long. Other embodiments may extend either or both of queues 24A, 26A. Moreover, other embodiments may use other forms of data communication units instead of frames. Other embodiments may also measure one frame to be a different bit-length. In still other embodiments, queues 24A, 26A could be a single data structure whose size may be a function of the round-trip delay. For example, a tree structure, such as a binary tree, could hold the data communication units as above, where one branch of the tree holds data received from MAC 28A while the other branch holds data to be sent to MAC 28A. Those skilled in the art will recognize that other data structures can also substitute for queues 24A, 26A.

Figure 4:
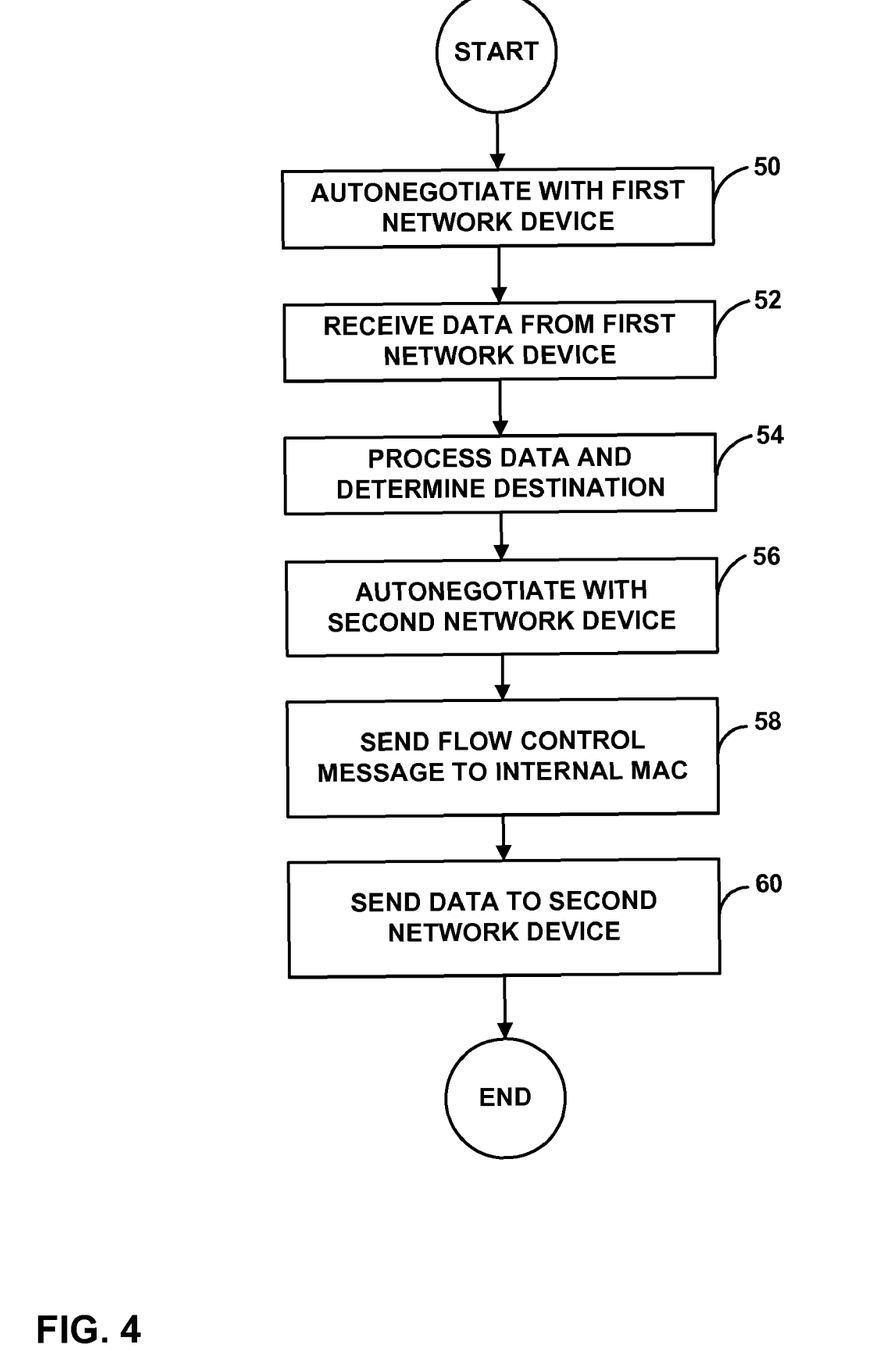
FIG. 4 is a flowchart illustrating the sequence of events for receiving and forwarding data communication units from one network device to another network device in accordance with one embodiment of the techniques described herein.

FIG. 4 is a flowchart illustrating the sequence of events for receiving and forwarding data communication units from one network device to another network device in accordance with one embodiment of the techniques described herein. In the exemplary embodiment, the sequence of events are described with respect to network switch 10 receiving data from network device 12A, and then network switch 10 forwarding the data to network device 12B. In the exemplary embodiment, the network entities exchange data communication units referred to herein as "frames," although in other embodiments data communication units may take on different forms, such as cells or packets. Those skilled in the art will appreciate that the exemplary embodiment may be modified to accommodate variations to the network entities, data communication units, and ordering of specific events without departing from the principles underlying the techniques described herein.

In exemplary computer network environment 2, network devices 12A and 12B have no direct connection, so they must communicate through network switch 10. At some point prior in time, network device 12A and network switch 10 autonegotiated a rate of communication via link 14A (50). In general, autonegotiation is the process by which two devices determine the maximum speed at which each may exchange frames, as well as whether the devices will operate in half-duplex or full-duplex mode. PHY 22A will perform autonegotiation on behalf of network switch 10 with network device 12A.

Once transmission rate module 38A or proxy MAC 20A and network device 12A have negotiated a data transmission rate and transmission mode, network device 12A is ready to send data. Subsequently, network device 12A may send a frame to network switch 10, which PHY 22A may receive via the interconnect medium and physical interface to link 14A (52).

Data transmission module 40A may place the inbound frame received from network device 12A in inbound queue 24A. Data transmission module 40A may send the frame to MAC 28A for processing when data transmission module 40A of MAC 28A is ready to receive data, i.e., depending on any flow control messages from MAC 28A. MAC 28A may form a processed data communication unit from the frame, which is passed to higher levels of the network (54). This processing and data transfer is described in greater detail with respect to FIG. 5.

Once processing is finished, the frame may be switched to a different MAC for forwarding. For example, MAC 28B may retrieve the processed data, as MAC 28B is associated with the destination of the original frame, namely, network device 12B, in accordance with the example. MAC 28B will likely have performed autonegotiation with network device 12B at some previous time to select a transmission rate for communication over link 14B (56). If MAC 28B operates at a data transmission rate which is higher than that supported by network device 12B, MAC 28B may attempt to send data to proxy MAC 20B at a rate much faster than proxy MAC 20B is permitted to send the data to network device 12B. Therefore, proxy MAC 20B may receive the data at the higher transmit rate of MAC 28B, buffer the outbound traffic, and start and stop transmission from MAC 28B using flow control.

For example, in some instances, flow control module 36B may be required to generate an internal flow control message requesting that MAC 28B temporarily halt transmission until all the pending outbound data of the MAC 20B can be processed (58). Flow control module 36B may construct the flow control message so as to halt the traffic temporarily, and upon processing all outbound data a second flow control message may be used to direct MAC 28B to reinitiate transmission, likely at a higher rate than supported by network device 12B. Data transmission module 40B may store the internal flow control message in inbound queue 24B where the flow control message will be enqueued to be sent to MAC 28B. Data transmission module 40B will send the contents of inbound queue 24B to MAC 28B, which contents may include the flow control message from flow control module 36B. While waiting to send the flow control message, network device 10 may receive a frame from network device 12B. Data transmission module 40B may store this additional frame in inbound queue 24B. Data transmission module 40B may store data transmitted from MAC 28B in input buffer 26B. Data transmission module 40B may transfer the contents of input buffer 26B, specifically the frame received from MAC 28B, to PHY 22B so that PHY 22B can transmit the frame to network device 12B, once network device 12B is ready to receive the data (60).

Figure 5:
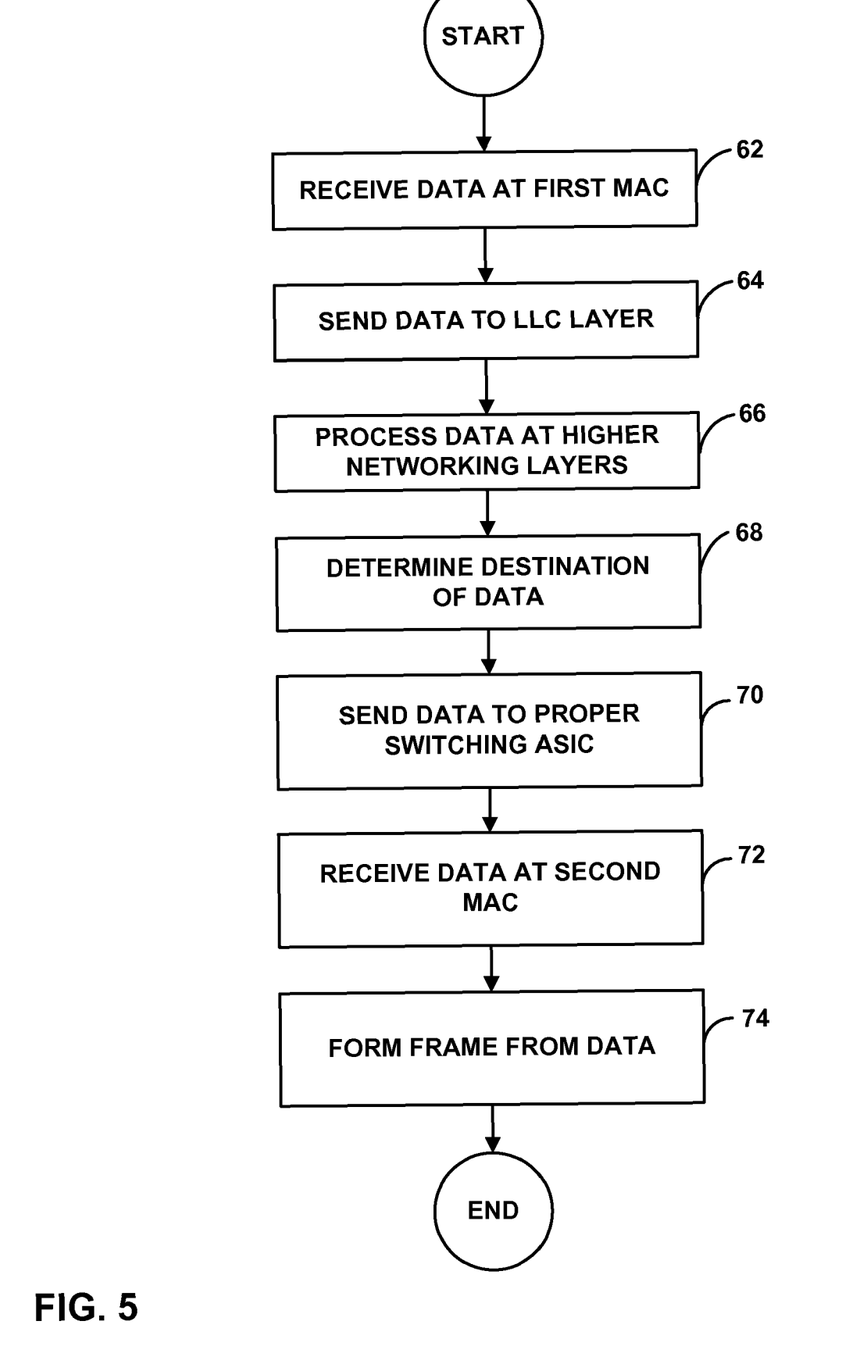
FIG. 5 is a flowchart illustrating the sequence of events of the exemplary embodiment for processing a frame in further detail.

FIG. 5 is a flow chart illustrating the sequence of events of the exemplary embodiment for processing a frame in further detail. First, an inbound frame may arrive at MAC 28A from link 14A by way of enhanced PHY 18A (62). MAC 28A may perform its standard processing on the frame, such as interpreting the frame and passing the frame to the logical link control ("LLC") level (64) as a processed data communication unit for higher-level network processing within switching ASIC 16A. Switching ASIC 16A, in turn, may pass the processed data communication unit to the core of network switch 10 for even higher levels of network processing (66). Such processing at higher levels may include determining the destination of the data communication unit through the use of look-up tables to identify an IP address and/or a MAC address (68). Once network switch 10 has determined the destination of the data communication unit, network switch 10 may send the data communication unit to the switching ASIC associated with that destination (70). In the example, this is switching ASIC 18B, as the destination is network device 12B. Switching ASIC 18B may perform processing upon the data communication unit, finally passing the outbound data communication unit to MAC 28B (72). MAC 28B, in turn, may form an outbound frame from the data communication unit (74) and send the frame to proxy MAC 20B, which may process and send the frame out network link 14B as described above.

Various embodiments of the invention have been described. These and other embodiments are within the scope of the following claims.

The invention claimed is:

1. A method comprising:
   establishing network communication between a first network device and a second network device over a communication link, wherein the first network device includes a first media access controller (MAC) associated with a communication port that is coupled to the communication link and a second MAC positioned between the first MAC and the communication port, wherein the second MAC operates as a proxy MAC for the first MAC;
   outputting an outbound data communication from the first MAC to the communication port at a first communication rate;
   intercepting the outbound data communication with the proxy MAC; and
   outputting the outbound data communication from the proxy MAC to the communication port at a second communication rate different from the first communication rate.

2. The method of claim 1, further comprising:
   generating an internal flow control message with the proxy MAC; and
   sending the internal flow control message from the proxy MAC to the first MAC.

3. The method of claim 2, further comprising:
   receiving, with the first MAC, the flow control message, and
   starting and stopping transmission of the outbound data communication from the first MAC in accordance with the flow control message.

4. The method of claim 1, further comprising autonegotiating the second communication rate at which the first network device transmits the outbound data communication to the second network device.

5. The method of claim 4, wherein autonegotiating the second communication rate comprises autonegotiating the second communication rate with the proxy MAC on behalf of the first MAC.

6. The method of claim 1, further comprising:
   receiving an inbound data communication from the second network device with the proxy MAC at the second communication rate;
   replacing, with the proxy MAC, a destination MAC address within the inbound data communication with a MAC address associated with the first MAC; and
   sending the inbound data communication from the proxy MAC to the first MAC at the first communication rate.

7. The method of claim 1,
   wherein the outbound data communication output by the first MAC to the communication port includes a source MAC address identifying the first MAC as a source of the outbound data communication and includes a destination MAC address identifying a second network device as a destination for the outbound data communication, and
   wherein the method further comprises substituting, with the second MAC, a MAC address of the second MAC as the source MAC address within the intercepted outbound data communication prior to outputting the outbound data communication to the communication port.

8. The method of claim 1, wherein the first network device is a network switch, the first MAC is implemented within a switching ASIC of the network switch, and the proxy MAC is implemented within interface hardware external to the switching ASIC.

9. The method of claim 1, further comprising:
   outputting the outbound data communication from the first MAC in accordance with a first communication standard; and
   outputting the outbound data communication from the proxy MAC in accordance with a second communication standard that is different from the first communication standard.

10. A network device comprising:
   a first media access controller (MAC) associated with a communication port, wherein the communication port associated with the first MAC is a physical communication port for connecting the network device to a link of a computer network, and wherein the first MAC is configured to output an outbound data communication to the communication port for transmission on the network link at a first communication rate; and
   a second MAC positioned between the first MAC and the communication port, the second MAC configured to intercept the outbound data communication and output the outbound data communication to the communication port for transmission on the network link at a second communication rate different from the first communication rate,
   wherein the outbound data communication output by the first MAC to the communication port includes a source MAC address identifying the first MAC as a source of the outbound data communication and includes a destination MAC address identifying a second network device as a destination for the outbound data communication, and wherein the second MAC positioned between the first MAC and the communication port substitutes its own MAC address as the source MAC address within the intercepted outbound data communication.

11. The network device of claim 10, wherein the second MAC is configured to operate as a proxy MAC for the first MAC.

12. The network device of claim 10, wherein the second MAC includes a flow control module that generates an internal flow control message and sends the internal flow control message from the second MAC to the first MAC to start and stop transmission of outbound data communications from the first MAC.

13. The network device of claim 10, wherein the second MAC includes a transmission rate module that autonegotiates with a second network device the second communication rate at which the second MAC transmits the outbound data communication.

14. The network device of claim 10, further comprising a 10 gigabit attachment unit interface ("XAUI") coupling the first MAC to the second MAC.

15. The network device of claim 10, further comprising:
a switching application specific integrated circuit (ASIC); and
interface hardware external to the switching ASIC coupling the ASIC to the communication port,
wherein the first MAC is implemented within the switching ASIC, and
wherein the second MAC is implemented within interface hardware external to the switching ASIC.

16. The network device of claim 10, wherein the network device is a network switch.

17. The network device of claim 10,
wherein the first MAC includes an interface configured to output the outbound data communication in accordance with a first communication standard, and
wherein the second MAC includes an interface configured to output the outbound data communication in accordance with a second communication standard that is different from the first communication standard.

* * * * *